(No Model.)

P. B. SKINNER.
MACHINE FOR TURNING WOODEN BOWLS.

No. 341,513. Patented May 11, 1886.

WITNESSES:
Henry W. Farnham
Thomas Watts

INVENTOR:
Prentice Brockley Skinner

UNITED STATES PATENT OFFICE.

PRENTICE BUCKLEY SKINNER, OF WILMINGTON, ASSIGNOR OF ONE-HALF TO THOMAS WATTS AND DAVID H. STAPP, BOTH OF AURORA, IND.

MACHINE FOR TURNING WOODEN BOWLS.

SPECIFICATION forming part of Letters Patent No. 341,513, dated May 11, 1886.

Application filed July 31, 1885. Serial No. 173,294. (No model.)

*To all whom it may concern:*

Be it known that I, PRENTICE BUCKLEY SKINNER, a citizen of the United States, residing at Wilmington in the county of Dearborn and State of Indiana, have invented a new and useful Bowl-Turning Machine, of which the following is a specification.

My invention relates to improvements in machines for turning wooden bowls, and is designed to produce a device in which is effected an economy of time and material in the manufacturing of the said bowls and an increasing of the attainable depth of the said bowls.

Figure 1:
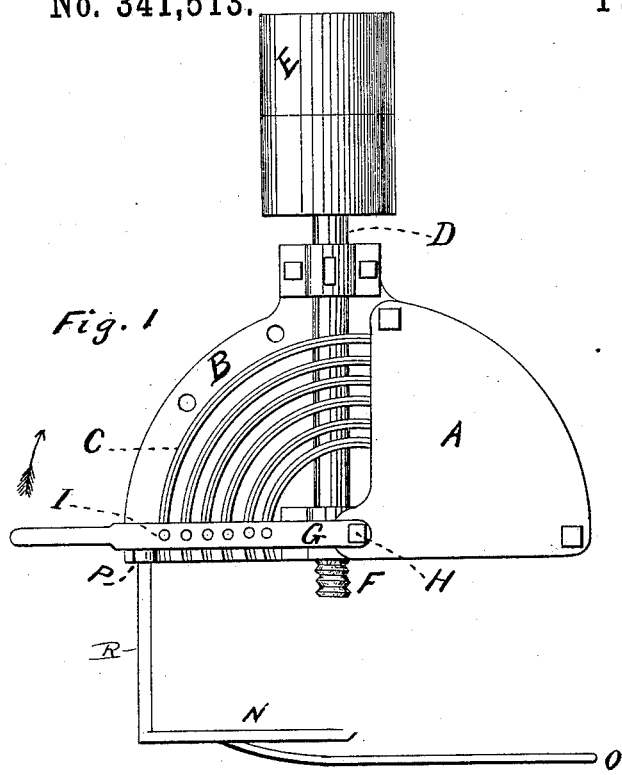
Figure 2:
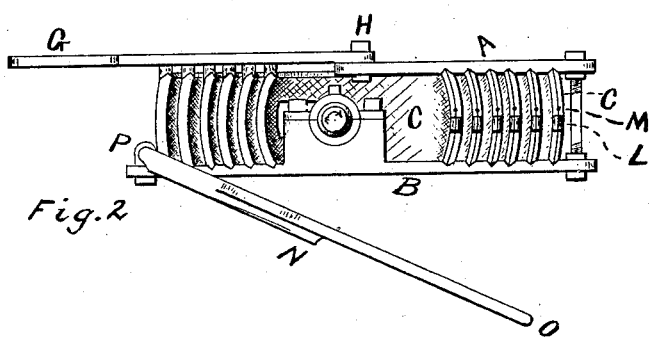
Figure 3:
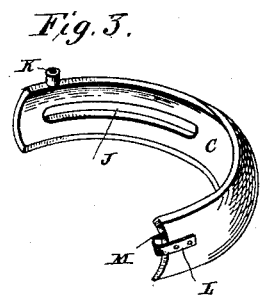

In the drawings, Figure 1 represents a plan view of the device; Fig. 2, a front elevation, and Fig. 3 a detail perspective of one of the knives.

The bed-plate B has on its upper surface or face a series of concentric grooves, and a parallel plate, A, of somewhat less than half the size of the bed-plate B, and arranged to rest over one side thereof, is provided with a similar series of grooves to those in the said bed-plate, and so placed as to match them. Resting in and guided by said grooves are the knife-arms C, curved laterally and longitudinally, and arranged concentrically. Each of these knife or cutter arms C carries at one end a knife or cutter, L, and is there also provided with a splitting-point, M, the two parts acting conjunctively to take a shaving from the block out of which the bowls are to be made, the point M spliting the block in advance of the cutter, and thus giving a smooth cut or finish, and not tearing the wood.

Pivoted on the plate A, at a point, H, central to the knife-arms C, is a lever, G, provided with a series of holes, I, corresponding or coinciding with sockets K on the said arms C. By inserting a pin through any of the holes I and into the corresponding socket, K, the arm carrying the said socket may be readily moved forward, so that cutter L will have a curved line of travel beyond the front of the plates A and B.

Journaled on the plate B is a shaft, D, carrying a drive-pulley, E, and extending across the face of the plate B, so as to pass to one side of the common center of the arm C. The said shaft D extends beyond the front of the said plate B, the said extension having a left-hand screw-thread, F, on it, and forming the carrier for the block from which the bowls are formed, the said block being screwed on the said extension and rotated with the shaft.

Each arm C has a longitudinal slot, J, through which passes the slot D, the latter forming a stop, that limits the travel of said arms.

The bowl as cut by the knife or cutter L is semi-spherical; hence, that a flattened bottom may be provided, a knife, N, operated by a handle or lever, O, and having an extended pivot or spindle, R, with a bearing in the eye P, is used, the operation being merely to carry the said knife across the bottom of the rotating block, and the flattened surface will be formed.

A nest of bowls is easily formed by advancing the knife-arms successively from that of the greatest radius to that of the smallest radius. The center of rotation of the block being to one side of the center of the travel of the knife-arms, the bowl may be made larger and deeper than though the centers were the same or in line.

I do not wish my claims to be interpreted as broadly covering curved cutter-arms in machines for bowl-making, as the same is not new.

I claim—

1. A bowl-making machine having parallel plates with coincident concentric guiding-grooves and a series of curved concentric cutter-arms guided in said grooves, substantially as specified.

2. A bowl-making machine having parallel plates with coincident concentric guiding-grooves, a concentric series of curved cutter arms, a lever pivoted to the common center of the arms and adapted to operate them, a shaft for carrying a block of wood, and a knife with an extended pivotal bearing, for leveling the bottoms of the bowls, substantially as specified.

3. In a bowl-making machine, a series of guided concentric cutter-arms, each provided with a longitudinal slot, combined with a block-carrying shaft extending through said slots and forming a stop for said arms, substantially as specified.

Witnesses:    PRENTICE BUCKLEY SKINNER.
HENRY W. FARNHAM,
THOMAS WATTS.